United States Patent

Furlani et al.

[11] Patent Number: 5,829,881
[45] Date of Patent: Nov. 3, 1998

[54] WEAR RESISTANT APPARATUS AND METHOD FOR TRANSLATING A PRINTING ELEMENT RELATIVE TO A FRAME

[75] Inventors: Edward P. Furlani, Lancaster; Syamal K. Ghosh, Rochester; Roger S. Kerr, Brockport, all of N.Y.

[73] Assignee: Eastman Kodak Company, Rochester, N.Y.

[21] Appl. No.: 845,338

[22] Filed: Apr. 25, 1997

[51] Int. Cl.⁶ ............................................ F16C 33/12
[52] U.S. Cl. ................................. 384/42; 384/907.1
[58] Field of Search ........................ 384/26, 42, 907, 384/907.1, 625, 282

[56] References Cited

U.S. PATENT DOCUMENTS

| | | | |
|---|---|---|---|
| 2,452,804 | 11/1948 | Sulprizio | 384/42 |
| 4,404,598 | 9/1983 | Sculli | 358/296 |
| 4,522,453 | 6/1985 | Lammer et al. | 384/42 |
| 4,738,081 | 4/1988 | Tisma | 384/42 X |
| 4,764,036 | 8/1988 | McPherson | 384/276 |
| 4,824,262 | 4/1989 | Kamigaito et al. | 384/42 |
| 5,092,687 | 3/1992 | Hall | 384/907.1 X |
| 5,342,129 | 8/1994 | Dennis et al. | 384/907.1 X |

*Primary Examiner*—Thomas R. Hannon
*Attorney, Agent, or Firm*—Clyde E. Bailey, Sr.

[57] ABSTRACT

An apparatus and method for translating a printing element relative to a frame has a wear resistant coating on translational rod bearings which support the element, such as a scanner, for slidable movement along a frame. Titanium nitride is coated over a hardened stainless steel core of the translational rod bearings and bearing pads which are arranged for sliding contact with the translational rod bearings. The bearing pads comprise diamond laminated tungsten carbide.

7 Claims, 3 Drawing Sheets

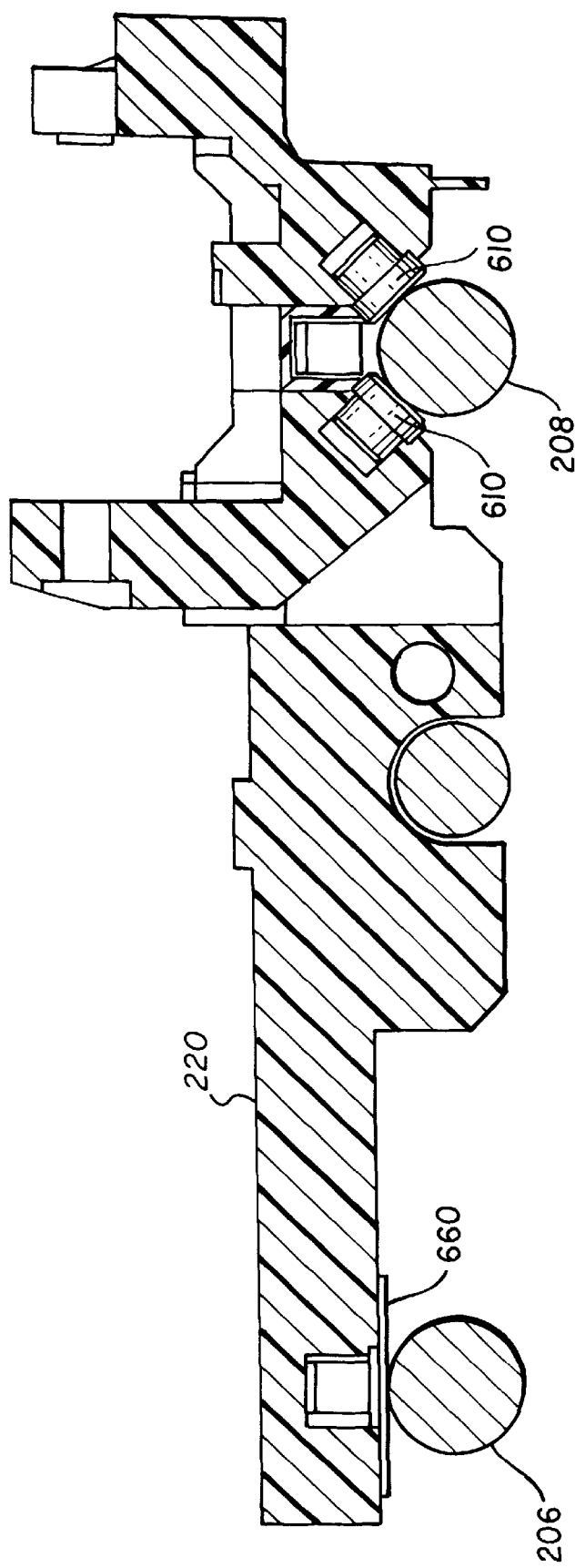
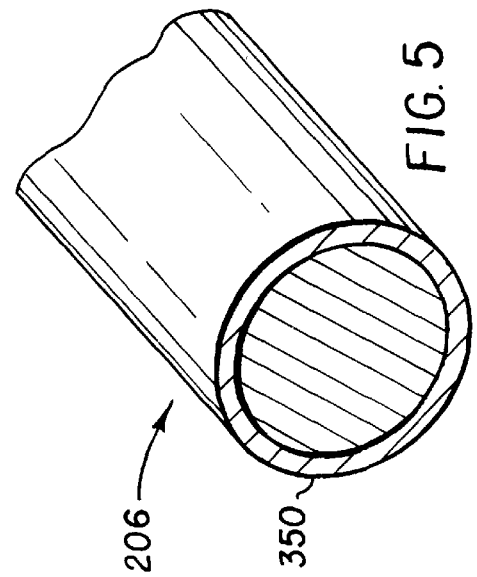

WEAR RESISTANT APPARATUS AND METHOD FOR TRANSLATING A PRINTING ELEMENT RELATIVE TO A FRAME

CROSS-REFERENCE TO RELATED APPLICATIONS

This application is related to U.S. Ser. No. 08/621,417 entitled "AN APPARATUS FOR PREVENTING AXIAL MOVEMENT OF A LEAD SCREW" by Roger S. Kerr et al.

FIELD OF THE INVENTION

This invention relates generally to the field of lathe bed scanners utilizing a frictionless bearing pad, more particularly, to a frictionless bearing pad coupled with wear resistant translational rod bearings.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing printing element, in which a donor transfers a dye to the thermal print medium upon a sufficient amount of thermal energy. This printer includes a plurality of diode lasers which can be individually modulated to supply energy to selected areas of the medium in accordance with an information signal. The print-head of the printer includes one end of a fiber optic array having a plurality of optical fibers coupled to the diode lasers. The thermal print medium is supported on a rotatable imaging drum, and the print-head with the fiber optic array is movable relative to the longitudinal axis of the drum. The dye is transferred to the thermal print medium as the radiation, transferred from the diode lasers to the donor printing element by the optical fibers, is converted to thermal energy in the donor printing element.

For permitting relative movement of the print-head, the print-head is mounted on a translation table which, in turn, is attached to a rotatable lead screw having a threaded shaft. The lead screw rests between two sides of the frame of the scanner where it is supported on both ends by bearings. At the drive end, the lead screw continues through the bearing, through a pair of spring retainers that are separated and loaded by a compression spring and to a drive motor. The drive motor induces rotation to the screw, and the compression spring functions to limit axial movement of the lead screw.

The print-head moves in accordance with the translation table which, in turn, moves axially along translational rod bearings in register with the media during the write process. To ensure proper image quality, the movement of the table, and hence the printhead, must be precise and smooth. To achieve smooth translation, the current systems make use of bearing pads embedded in the bottom of the translation table that make contact with the translational rod bearings thereby reducing friction between the table and the bearing shafts. These pads are made from a commercially available plastic Delrin™ and the bearings are made from AISI 400 series stainless steel. This bearing apparatus is inadequate because it has significant friction which results in premature wear and consequently costly service and calibration.

There have been numerous attempts to solve the above friction and wear problems above. For instance, U.S. Pat. No. 4,764,036 discloses tungsten carbide (WC) radial bearing or thrust inserts. The entire assembly is used as a hydrodynamic bearing in contrast to our invention as frictionless or rather low friction slide bearing. Further, U.S. Pat. No. 4,522,453 relates to the use of PVD (physical vapor deposition) and CVD (chemical vapor deposition) coatings comprising borides, nitrides and carbides as corrosion resistant as well as protection against high temperature wear. Moreover, U.S. Pat. No. 4,404,598 describes construction of engraving machines comprising lightweight lathe bed configurations. Low coefficient of friction Nylatron™ plastic pads are used on which rides the carriage.

Although the presently known and utilized scanner is satisfactory, it is not without shortcomings. The Delrin™ pads and the translational rod bearings are subjected to wear and abrasion and consequently require frequent maintenance and replacement. This is obviously labor intensive, time consuming and expensive.

Consequently, a need exists for improvements in the construction of the lathe bed scanner so as to overcome the above-described shortcomings.

SUMMARY OF THE INVENTION

The present invention is directed to overcoming one or more of the problems set forth above. Briefly summarized, according to one aspect of the present invention, a wear resistant apparatus for slidably moving a printing element along a frame includes a first translational rod bearing for supporting a first end portion of the printing element for slidable movement in the frame. The first translational rod bearing is in sliding contact with a first bearing pad assembly arranged in the first end portion of the printing element. Further, a second translational rod bearing cooperatively associates with the first translational rod bearing for supporting the second end portion of the printing element for slidable movement in the frame. The second translational rod bearing is arranged in sliding contact with a second bearing pad assembly which is arranged in the second end portion of the printing element. In this embodiment, the first and second translational rod bearings comprises a central core of hardenable stainless steel and a hard wear resistant coating on the central core. Moreover, the first and second bearing pad assemblies comprise at least one bearing pad. The bearing pad comprise a laminate having a first innermost layer of tungsten carbide and a second outermost layer of a crystalline carbon material laminated to the first innermost layer. The second outermost layer of the bearing pad assembly defines a bearing contact surface. Finally, any reasonably suitable drive means is provided operably connected to the printing element for providing movement of the printing element along the first and second translational rod bearings in the frame.

It is the object of the present invention to provide bearing pads which have a very low coefficient of friction when they come in contact with another moving member to overcome the above-described drawbacks.

It is another object of the present invention to make the translational rod bearings more wear resistant by coating with a hard material.

It is an advantage of the present invention to provide improved reliability of the bearing pad and translational rod bearing assembly.

It is an advantage of the present invention to eliminate or reduce wear due to excessive friction between the pad and the translational rod bearings.

It is an advantage of the present invention to provide a frictionless pad and translational rod bearing assembly that reduces or eliminates the need for calibration.

BRIEF DESCRIPTION OF THE DRAWINGS

The above and other objects of the present invention will become apparent when taken in conjunction with the following description and drawings wherein identical reference numerals have been used, where possible, to designate identical printing elements that are common to the figures.

FIG. 3 is a cross-sectional side view of the translation table for the present invention;

FIG. 4 is a cross-sectional view of the bearing pad of the present invention; and FIG. 5 is a fragmented cross-sectional view of the translational rod bearing of the present invention.

DETAILED DESCRIPTION OF THE INVENTION

Figure 1:
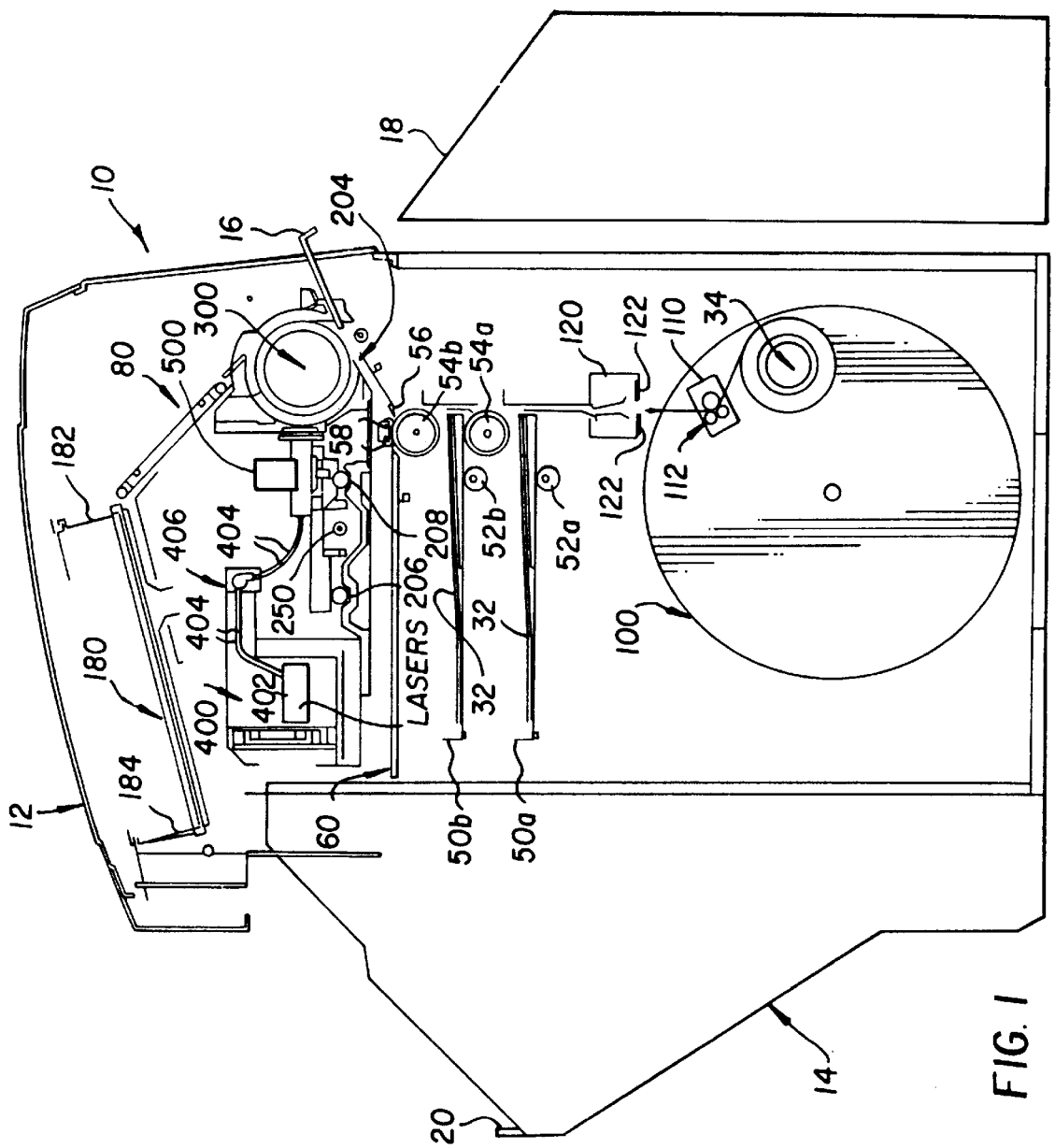
FIG. 1 is a side view in vertical cross section of an image processing apparatus of the present invention.

Referring to FIG. 1, there is illustrated an image processing apparatus 10 according to the present invention having an image processor housing 12 for forming a protective cover. A movable, hinged image processor door 14 is attached to the front portion of the image processor housing 12 for permitting access to two sheet material trays, lower sheet material tray 50a and upper sheet material tray 50b, that are positioned in the interior portion of the image processor housing 12 for supporting thermal print media 32 thereon. It will be obvious to those skilled in the art that only one of the sheet material trays 50 will dispense the thermal print media 32 out of its sheet material tray 50 to create an intended image thereon; the alternate sheet material tray 50 either holds an alternative type of thermal print media 32 or functions as a back up. In this regard, the lower sheet material tray 50a includes a lower media lift cam 52a for lifting the lower sheet material tray 50a and ultimately the thermal print media 32 upwardly toward a rotatable, lower media roller 54a and, ultimately, toward a second rotatable, upper media roller 54b which, when both are rotated, permit the thermal print media 32 to be pulled upwardly towards a media guide 56. The upper sheet material tray 50b includes a upper media lift cam 52b for lifting the upper sheet material tray 50b and ultimately the thermal print media 32 towards the upper media roller 54b which directs it towards the media guide 56.

The movable media guide 56 directs the thermal print media 32 under a pair of media guide rollers 58 which engages the thermal print media 32 for assisting the upper media roller 54b in directing it onto the media staging tray 60. The media guide 56 is attached and hinged to the interior of the housing 12 at one end, and is uninhibited at its other end for permitting multiple positioning of the media guide 56. The media guide 56 then rotates its uninhibited end downwardly, as illustrated in the position shown, and the direction of rotation of the upper media roller 54b is reversed for forcing the thermal print medium receiver sheet material 32 resting on the media staging tray 60 under the pair of media guide rollers 58, upwardly through an entrance passageway 204 and around a rotatable vacuum imaging drum 300.

A roll of dye donor material 34 is connected to the media carousel 100 in a lower portion of the image processor housing 12. Four rolls are used, but only one is shown for clarity. Each roll includes a dye donor material 34 of a different color, typically black, yellow, magenta and cyan. These dye donor materials 34 are ultimately cut into dye donor sheet materials and passed to the vacuum imaging drum 300 for forming the medium from which dyes imbedded therein are passed to the thermal print media 32 resting thereon, which process is described in detail herein below. In this regard, a media drive mechanism 110 is attached to each roll of dye donor material 34, and includes three media drive rollers 112 through which the dye donor material 34 of interest is metered upwardly into a media knife assembly 120. After the dye donor material 34 reaches a predetermined position, the media drive rollers 112 cease driving the dye donor material 34 and the two media knife blades 122 positioned at the bottom portion of the media knife assembly 120 cut the dye donor material 34 into dye donor sheet materials. The media rollers 54 and media guide 56 then pass the dye donor sheet material onto the media staging tray 60 and ultimately to the vacuum imaging drum 300 and in registration with the thermal print media 32 using the same process as described above for passing the thermal print media 32 onto the vacuum imaging drum 300. The dye donor sheet material now rests atop the thermal print media 32 with a narrow gap between the two created by microbeads imbedded into the thermal print media 32.

A laser assembly 400 includes a quantity of laser diodes 402 in its interior portion, and these lasers 402 are connected via fiber optic cables 404 to a distribution block 406 and ultimately to the printhead 500. The printhead 500 directs thermal energy received from the laser diodes 402 for causing the dye donor sheet material to pass the desired color of dye across the gap to the thermal print media 32. The printhead 500 is attached to a lead screw 250 via a lead screw drive nut 254 driven by linear drive motor 258 (FIG. 2) for permitting movement axially along the longitudinal axis of the vacuum imaging drum 300 for transferring the data to create the intended image onto the thermal print media 32.

For writing, the vacuum imaging drum 300 rotates at a constant velocity, and the printhead 500 begins at one end of the thermal print media 32 and traverses the entire length of the thermal print media 32 for completing the transfer process for the particular dye donor sheet material 34 resting on the thermal print media 32. After the printhead 500 has completed the transfer process, the particular dye donor sheet material resting on the thermal print media 32 is then removed from the vacuum imaging drum 300 and transferred out the image processor housing 12 via a skive or ejection chute 16. The dye donor sheet material eventually comes to rest in a waste bin 18 for removal by the user. The above described process is then repeated for the other three rolls 30 of dye donor materials 34.

After the color from all four sheets of the dye donor sheet materials 34 have been transferred, the thermal print media 32 is transported via a transport mechanism 80 through an entrance door 182 to a color binding assembly 180. The entrance door 182 is opened for permitting the thermal print media 32 to enter the color binding assembly 180, and shuts once the thermal print media 32 comes to rest in the color binding assembly 180. The color binding assembly 180 processes the thermal print media 32 for further binding the transferred colors on the thermal print media 32 and for sealing the microbeads thereon. After the color binding process has been completed, a media exit door 184 is opened and the thermal print media 32 with the intended image thereon passes out of the color binding assembly 180 and the image processor housing 12 and comes to rest against a media stop 20.

Figure 2:
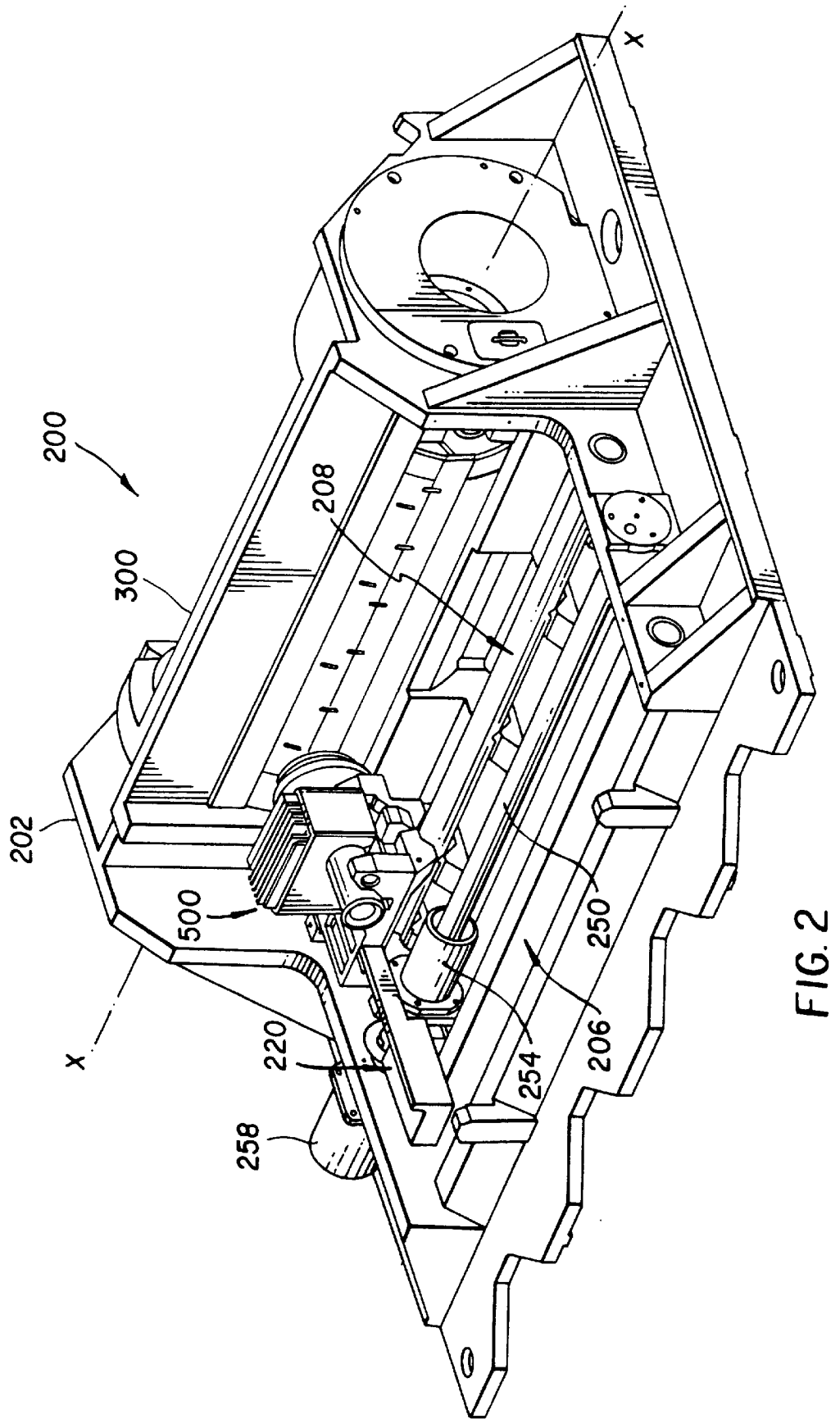
FIG. 2 is a perspective of the lathe bed scanning subsystem or write engine of the present invention.

Referring to FIG. 2, there is illustrated a perspective of the lathe bed scanning subsystem 200 of the image processing apparatus 10, including the vacuum imaging drum 300, printhead 500 and lead screw 250 assembled in the lathe bed scanning frame 202. The vacuum imaging drum 300 is mounted for rotation about an axis X in the lathe bed scanning frame 202. The printhead 500 is movable with respect to the vacuum imaging drum 300, and is arranged to direct a beam of light to the dye donor sheet material (shown in FIG. 1). The beam of light from the printhead 500 for each laser diode 402 (not shown in FIG. 2) is modulated individually by modulated electronic signals from the image processing apparatus 10, which signals are representative of the shape and color of the original image, so that the color on the dye donor sheet material 34 is heated to cause volatilization only in those areas in which its presence is required on the thermal print media 32 to reconstruct the shape and color of the original image.

The printhead 500 is mounted on a movable translation printing element 220 which, in turn, is supported for low friction slidable movement on translational rod bearings 206 and 208. The translational rod bearings 206 and 208 are sufficiently rigid so that they do not sag or distort between their mounting points and are arranged as parallel as possible with the axis X of the vacuum imaging drum 300 with the axis of the printhead 500 perpendicular to the axis X of the vacuum imaging drum 300 axis. The front translational rod bearing 208 locates the translation printing element 220 in the vertical and the horizontal directions with respect to axis X of the vacuum imaging drum 300. The rear translational rod bearing 206 locates the translation printing element 220 only with respect to rotation of the translation printing element 220 about the front translational rod bearing 208 so that there is no over-constraint condition of the translation printing element 220 which might cause it to bind, chatter, or otherwise impart undesirable vibration or jitters to the printhead 500 during the generation of an intended image.

Referring to FIG. 3, there is illustrated a partial vertical cross-sectional view of the lathe bed scanning subsystem comprising an alternative embodiment of the front translational rod bearing 208, rear translational rod bearing 206, front pad bearing assembly 610 and the rear pad bearing 660 of the present invention. It is to be noted that the front and rear translational rod bearings as well as the bearing pad assemblies have identical functions although the bearing pad assemblies differ in design and physical dimensions.

Referring to FIG. 4, the alternative embodiment of the frictionless bearing pad 610 comprises the use of a tungsten carbide (WC) substrate 614 having thickness ranging from 5 to 50 mm, laminated with sintered industrial grade sintered diamond wafer 616 having thickness ranging from 1 to 5 mm. The diamond laminated WC bearing pad is fastened to the bearing pad housing 620 or attached by shrink fitting as is well known to the artisans. The WC substrate is made using particulate WC powder mixed with Co or Ni metal in the range of 2 to 20% by weight. The preferred Co or Ni concentration is 6% by weight. The mechanical mixture of ceramic WC and the metal Co or Ni is known as "cermet" to the artisans. WC cermet substrates having simple shapes can be made by dry pressing the cermet powder mixed with 2 to 5 weight % organic binder such as polyvinyl alcohol, polyvinyl acetate, or polyethylene glycol using uniaxial pressure of 6,000 to 20,000 psi, preferably 10,000 psi. The pressed substrate is sintered preferably in a vacuum furnace at 1600° to 1900° C., preferably at 1750° C. The sintering schedule includes heating the substrate in vacuum of $1 \times 10^{-5}$ to $5 \times 10^{-6}$ Torr from room temperature to 500° C. at 5° C. per minute, from 500° C. to 1750° C. at 12° C. per minute, sintering at a holding temperature of 1750° C. for at least 1 hour and then cooled to room temperature at 15° C. per minute. The sintered substrate attains 95 to 99% of the theoretical density. The average particle size of WC powder ranges from 0.5 to 5 $\mu$m, the preferred particle size being 1 $\mu$m. Sintered diamond laminates are obtained from Smith Tool Co or Norton. The diamond laminate 616 is brazed to the WC substrate using Ag—Cu or Ag—Cu—Ti alloy at 750° to 820° C. in vacuum The brazing material 612 used was Cerametel 721™ manufactured by Lucas-Milhaupt, Inc at Wisconsin. The brazing material Cerametel 721™ comprises 72 weight % silver and 28 weight % copper. A foil of the brazing material 612 was sandwiched between the diamond wafer 616 and a WC substrate 614 and fixtured such that the assembly does not move during the heating process. The brazing assembly was placed inside a vacuum furnace and the furnace was evacuated to $10^{-5}$ Torr. The furnace was then backfilled with Ar gas and the furnace was heated to 700° C. at a rate of 50° C. per minute. After the furnace attained the temperature 700° C. and stabilized, the brazing assembly was heated again to 780° to 800° C., preferably at 785° C. for 5 minutes and then the furnace was cooled to room temperature at 30° C. per minute. The bearing pad assembly was then attached to the housing 620 as described earlier. Alternatively, the diamond laminate 616 can be bonded to the WC substrate 614 using high strength epoxy resins. Referring to FIG. 3 again, the rear and front translational rod bearings 206 and 208, respectively are made from hardenable AISI 400 series stainless steel (hardness: Rockwell C 58 to 60) and coated with titanium nitride coating. Alternatively, the translational rod bearings 206, 208 can also be coated with hard and wear resistant titanium carbonitride, Ti(C,N) coating.

Referring to FIG. 5, the translational rod bearing 206 is coated with wear resistant TiN coating 350 having thickness ranging from 3 to 5 $\mu$m. The TiN coating is deposited using a PVD (physical vapor deposition) process. Ion plating is a preferred PVD process which is well known to the artisans. Simply stated, the process involves evaporating titanium metal with an electron beam in a vacuum chamber in a nitrogen-argon plasma whereby vaporized Ti is ionized by the plasma and combine with nitrogen ions to form TiN on the substrate which is biased negatively.

It will be obvious to those skilled in the art that by providing low friction and wear resistant bearing pads in conjunction with wear resistant translational rod bearings, the translation motion will be smooth and consistent.

The invention has been described with reference to the preferred embodiment thereof. However, it will be appreciated and understood that variations and modifications can be effected within the spirit and scope of the invention as described herein above and as defined in the appended claims by a person of ordinary skill in the art without departing from the scope of the invention.

PARTS LIST

10 Image processing apparatus
12 Image processor housing
14 Image processor door
16 Donor ejection chute
18 Donor waste bin
20 Media stop 32 Thermal print media
34 Dye donor roll material
50 Sheet material trays
50a Lower sheet material tray
50b Upper sheet material tray
52 Media lift cams
52a Lower media lift cam
52b Upper media lift cam
54 Media rollers
54a Lower media roller
54b Upper media roller
56 Media guide
58 Media guide rollers
60 Media staging tray
80 Transport mechanism
100 Media carousel
110 Media drive mechanism
112 Media drive rollers
120 Media knife assembly
122 Media knife blades
180 Color binding assembly
182 Media entrance door
184 Media exit door
200 Lathe bed scanning subsystem
202 Lathe bed scanning frame
204 Entrance passageway
206 Rear translational rod bearing
208 Front translational rod bearing
220 Translation printing element
250 Lead screw
254 Lead screw drive nut
258 Linear drive motor
280 Preload member
282 Inner preload spacer
284 Outer preload spacer
300 Vacuum imaging drum
350 Coating
400 Laser assembly
402 Lasers diode
404 Fiber optic cables
406 Distribution block
450 Writing swath
500 Printhead
610 Front bearing pad assembly
612 Brazing material
614 WC substrate
616 Diamond wafer
620 Bearing pad housing
660 Rear bearing pad assembly

What is claimed is:

1. Wear resistant apparatus for translating a printing element relative to a frame, said printing element having a first end portion and a second end portion, said apparatus comprising:

a first translational rod bearing for supporting said first end portion of said printing element for slidable movement in said frame, said first translational rod bearing being in sliding contact with a first bearing pad assembly arranged in said first end portion of said printing element;

a second translational rod bearing cooperatively associated with said first translational rod bearing for supporting said second end portion of said printing element for slidable movement in said frame, said second translational rod bearing being in sliding contact with a second bearing pad assembly arranged in said second end portion of said printing element;

wherein each of said first and second translational rod bearings comprises a central core of hardenable stainless steel and a hard wear resistant coating on said central core; and, wherein each of said first and second bearing pad assemblies comprises at least one bearing pad, said bearing pad comprising a laminate having a first innermost layer of tungsten carbide and a second outermost layer of a diamond material laminated to said first innermost layer, said second outermost layer defining a bearing contact surface; and, drive means operably connected to said printing element for providing movement of said printing element along said first and second translational rod bearings in said frame.

2. The apparatus recited in claim 1, wherein said diamond material is laminated to said first innermost layer of tungsten carbide by an epoxy resin.

3. The apparatus recited in claim 1, wherein said diamond material is laminated to said first innermost layer of tungsten carbide by silver brazing.

4. The apparatus recited in claim 1, wherein said central core comprising stainless steel having a Rockwell C hardness in the range of about 58 to about 60, and wherein said stainless steel has coated thereon a titanium nitride coating layer.

5. The apparatus recited in claim 1, wherein said first innermost layer of tungsten carbide comprises about 2% to about 20% by weight cobalt and has a thickness in the range of about 5 to about 50 mm.

6. The apparatus recited in claim 1, wherein said first innermost layer of tungsten carbide comprises about 2% to about 20% by weight nickel and has a thickness in the range of about 5 to about 50 mm.

7. Method of translating a printing element relative to a frame, comprising the steps of:

providing the apparatus of claim 1; and, activating said drive means thereby causing said printing element to translationally move along said first and second translational rod bearings.

* * * * *